US008013909B2

(12) United States Patent
Nikkanen et al.

(10) Patent No.: US 8,013,909 B2
(45) Date of Patent: Sep. 6, 2011

(54) METHOD AND APPARATUS FOR ADJUSTING EXPOSURE IN DIGITAL IMAGING

(75) Inventors: Jarno Nikkanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 592 days.

(21) Appl. No.: 11/667,140

(22) PCT Filed: Dec. 29, 2004

(86) PCT No.: PCT/FI2004/050198
§ 371 (c)(1),
(2), (4) Date: May 3, 2007

(87) PCT Pub. No.: WO2006/070046
PCT Pub. Date: Jul. 6, 2006

(65) Prior Publication Data
US 2008/0043112 A1    Feb. 21, 2008

(51) Int. Cl.
H04N 5/235    (2006.01)
(52) U.S. Cl. .................... 348/229.1; 348/362
(58) Field of Classification Search .............. 348/362, 348/229.1, 221.1, 223.1, 225.1, 208.16
See application file for complete search history.

(56) References Cited

U.S. PATENT DOCUMENTS

| 5,227,835 A | 7/1993 | Anagnostopoulos ......... 354/412 |
| 2001/0004400 A1* | 6/2001 | Aoki et al. .................. 382/107 |
| 2002/0006163 A1* | 1/2002 | Hibi et al. ............... 375/240.16 |
| 2003/0098922 A1* | 5/2003 | Barkan ....................... 348/362 |
| 2005/0248660 A1* | 11/2005 | Stavely et al. .......... 348/208.16 |

FOREIGN PATENT DOCUMENTS

| EP | 0 886 439 A2 | 12/1998 |
| EP | 1035510 A2 | 9/2000 |
| KR | 1999-002387 | 1/1999 |
| WO | WO-01/87377 A2 | 11/2001 |
| WO | WO 2005/001563 A1 | 1/2005 |

* cited by examiner

Primary Examiner — Nelson D. Hernández Hernández
(74) Attorney, Agent, or Firm — Harrington & Smith

(57) ABSTRACT

The invention relates to electronic equipment for performing imaging, including a camera (CAM) for forming image frames (FRp, FRc), using set exposure parameters (ET, AG, DG), and a unit for determining the total exposure level (EV), from at least some of the image frames, and a unit for adjusting the said exposure parameters on the basis of the determined total exposure level of the exposure. In addition, the equipment also includes a motion-detection for detecting movement from at least some of the image frames. In the equipment the exposure parameters are arranged to be adjusted on the basis of the said total exposure level of the exposure and the detected movement.

17 Claims, 10 Drawing Sheets

METHOD AND APPARATUS FOR ADJUSTING EXPOSURE IN DIGITAL IMAGING

TECHNICAL FIELD

The present invention concerns electronic equipment for performing imaging, including
camera means for forming image frames, using set exposure parameters,
means for determining the total exposure level, to determine the total exposure level of the exposure, from at least some of the image frames, and
adjustment means of exposure parameters, for adjusting the said exposure parameters, on the basis of the determined total exposure level of the exposure.
In addition, the invention also concerns a corresponding method, system, and program product.

BACKGROUND

When performing still or video imaging of moving subjects, for example, in low lighting (for example, when taking indoor pictures of children), the images are often distorted, due to blurring caused by movement and a long exposure time. An example of a shot according to the prior art is shown in FIG. 8d, in which the stationary subject has been imaged by moving the camera vertically.

In the prior art, the total exposure of a shot is determined using the exposure time and analog and digital gain. The aperture size too can be adjusted, if it is an adjustable type. However, particularly mobile devices lack the possibility to adjust the aperture. Lower lighting demands a longer exposure time. Unfortunately, a longer exposure time will increase blurring caused by a moving subject, or camera shake at the moment of shooting/in imaging. Analog gain can be used to compensate for part of the exposure time required. In that, for example, doubled analog gain will half the necessary exposure time, but at the same time, however, the noise level will increase.

Analog gain amplifies the noise that has already been generated in the image. Nevertheless, it can be used to reduce quantization noise that occurs in connection with image capture, which in the worst case appears as the total loss of levels from the image. Digital gain, which is used along with analog gain, does not in reality bring additional information to the image. Digital gain only simply amplifies the image signal and the noise, which are results of the exposure time used and of analog gain. In addition, the possibilities to use analog gains and exposure times and their feasibilities vary from one sensor to another.

In the AEC (Automatic Exposure Control) method according to the prior art, the AEC mode of a digital camera typically sets the exposure time in such a way that, at the maximum, only just amount analog gain is used to prevent the noise level of the analog gain from reaching a disturbing level. In low-lighting conditions, this causes serious blurring, particularly in moving subjects (the actual level of lighting, at which the problem begins to appear, depends on the properties of the camera sensor). A large amount of motion-blurring will destroy the details in the image even more than the noise arising from use of analog gain.

The prior art knows different kinds of user-selectable exposure programs from several camera devices, which can be called, for example, 'sport programs' of exposure, if the program is intended for difficult exposure conditions of the type described above (for example, for imaging moving subjects). In these, greater analog/digital gain can be permitted to prevent motion blurring, so that the exposure times are, in turn, kept shorter. A sport program cannot, however, be used as a default program, as it may cause an unnecessarily high level of noise, for example, in bright lighting conditions, or in low lighting conditions, in which there are no moving subjects.

Entirely manually adjusted exposure programs are also known. In these, the end user can select a precise exposure time and analog gain (which is typically called an ISO setting, a name inherited from traditional cameras) and thus make a compromise between motion blurring and noise.

Flash lighting can also be used as a means to solve the problem in the case of still images, but it cannot be applied to video. In addition, some digital cameras and particularly mobile terminals equipped with digital cameras, completely lack flash lighting, due to considerations of space/price/power consumption.

SUMMARY

The present invention is intended to create a way to adjust exposure in digital imaging, by means of which it is possible to prevent, or at least reduce blurring caused by movement of the imaging subject and/or the camera, compared to the methods of the prior art. The invention is particularly suitable for application in devices with a limited processing capability. The characteristic features of the equipment and method according to the invention are stated in the accompanying claims. For example, according to an embodiment of the invention, disclosed is an electronic equipment for performing imaging, including camera means for forming consecutive raw-image frames, using set exposure parameters, means for determining the total exposure level, to determine the total exposure level of the exposure, from at least some of the raw-image frames, and adjustment means of exposure parameters, for adjusting the said exposure parameters, on the basis of the determined total exposure level of the exposure. The equipment also includes motion-detection means for detecting movement from at least some of the image frames, and in which equipment the exposure parameters are arranged to be adjusted on the basis of the said total exposure level of the exposure and the detected movement.

According to another embodiment of the invention, disclosed is a method in adjusting exposure in digital imaging, in which method, as a loop, image frames are formed using set exposure parameters. The exposure parameters are adjusted and in which in addition, as one sub-stage of the method, the total exposure level of the exposure is determined from at least some of the image frames, on the basis of which the said adjustment of the exposure parameters is performed. In the method, movement is detected from at least some of the image frames, in which case the exposure parameters are adjusted on the basis of the said total exposure level of the exposure and the detected movement.

In addition, the invention also relates to a corresponding program product and system, the characteristic features of which are stated in the accompanying claims. For example, according to an embodiment of the invention, disclosed is a program product for adjusting exposure parameters in a digital imaging chain, which includes camera means for forming image frames using set exposure parameters, and which program product consists of storage means and program code, written on the storage means, to be executed using processor means. The program code includes first code means configured to determine the total exposure level of the exposure, from at least some of the image frames and second code means for adjusting the exposure parameters on the basis of the determined total exposure level of the exposure. The program code additionally includes third code means, configured to detect movement from at least some of the image frames and fourth code means, configured to adjust the exposure parameters on the basis of the total exposure level of the exposure and the detected movement.

According to another embodiment of the invention, disclosed is a system for performing imaging. The system includes camera means for forming image frames and using set exposure parameters, means for determining the total exposure level, for determining the total exposure level of the exposure from at least some of the image frames, and adjustment means of exposure parameters, for adjusting the exposure parameters on the basis of the determined total exposure level of the exposure. The system additionally includes motion-detection means, for detecting movement from at least some of the image frames and in which system the exposure parameters are arranged to be adjusted on the basis of the total exposure level of the exposure and the detected movement.

The electronic equipment according to the invention for performing imaging includes
- camera means for forming image frames, using set exposure parameters,
- means for determining the total exposure level, to determine the total exposure level of the exposure, from at least some of the image frames, and
- adjustment means of the exposure parameters, for adjusting the said exposure parameters, on the basis of the determined total exposure level of the exposure.

The equipment additionally includes
- motion-detection means for detecting movement from at least some of the image frames.

In the equipment, the exposure parameters are arranged to be adjusted on the basis of the said total exposure level of the exposure and of the detected movement.

Movement can be detected, for example, by comparing image frames. According to one embodiment, at least part of the total image area of the image frames can be divided in a set manner into regions and variance, or some other quantity depicting changes in pixel values can be defined for the regions. The same, already collected pixel data, which are used, for example, to determine the total exposure level, can be applied in the calculation of the variances. By comparing the variances of the corresponding areas of the image frames to each other, it is possible to determine if there is movement in the image. This implementation model is efficient in terms of the processing capacity of the equipment.

Owing to the invention, numerous advantages relating to exposure in digital imaging are achieved, in the cases of both still and video imaging. Because, according to one embodiment, the method according to the invention can be applied in equipment even as a fully automatic and default functionality, then as a first advantage, the invention permits an exposure model, in which the end user need have no expertise, experience or skill in exposure or imaging, even in the most difficult imaging conditions/situations. According to the invention, it is no longer necessary to select a manual exposure program, instead the user can perform imaging without having to think about the current conditions or imaging habits. The invention functions automatically in conditions ranging from very bright light to very low light.

According to a second embodiment, the invention can even be implemented in equipment with a limited processing capacity, such as, for example, in mobile terminals or digital cameras. This is partly made possible by the surprising 'lightness' of the algorithm detecting the amount of movement in an image. In addition, the invention is also suitable for application with various imaging chains and AEC algorithms.

According to one embodiment, the total exposure level can be determined in connection with the imaging situation, using any AEC algorithm at all. Once the total exposure level has been determined, it is then possible to apply the invention to determine the most suitable ratio between the different exposure parameters, by means of which the desired total exposure level in question can be achieved.

Due to the motion expression according to the invention, the solution disclosed influences good image quality more than what can be achieved using, for example, the manual 'sports mode' systems according to the prior art, which have static limits for the exposure time. Through the invention, the level limiting the exposure time can be combined with the amount of movement detected in the image and, as a result only the essential amount of noise-creating analog gain is used. This is particularly important in low light.

The other characteristic features of the invention are apparent from the accompanying Claims while additional advantages achieved are itemized in the description portion.

BRIEF DESCRIPTION OF THE DRAWINGS

The invention, which is not restricted to the embodiments disclosed in the following, is examined in greater detail with reference to the accompanying drawings, in which.

DETAILED DESCRIPTION

Figure 1:
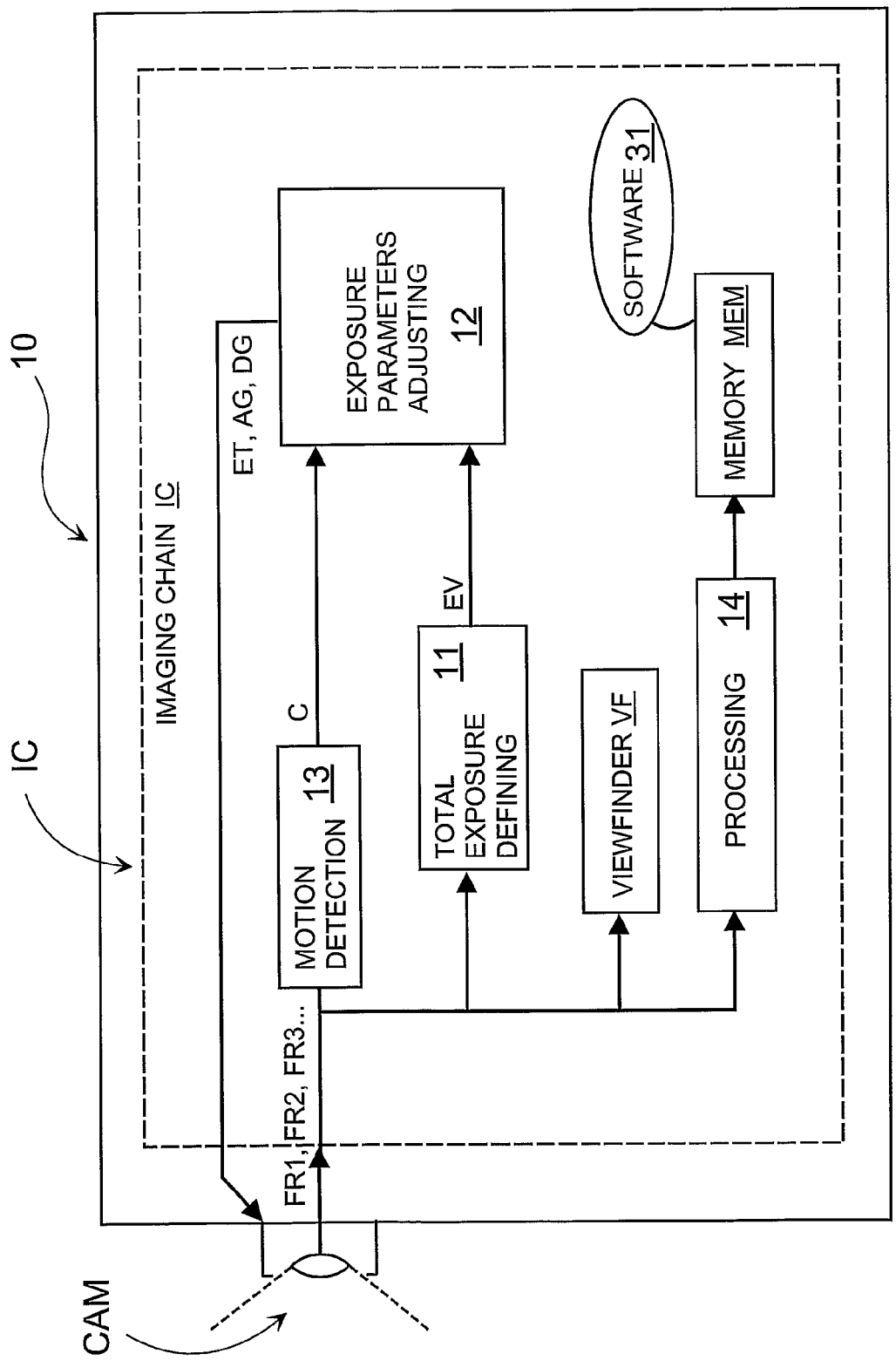
FIG. 1 shows a block diagram of a schematic example of an application of the electronic equipment according to the invention.
Figure 2:
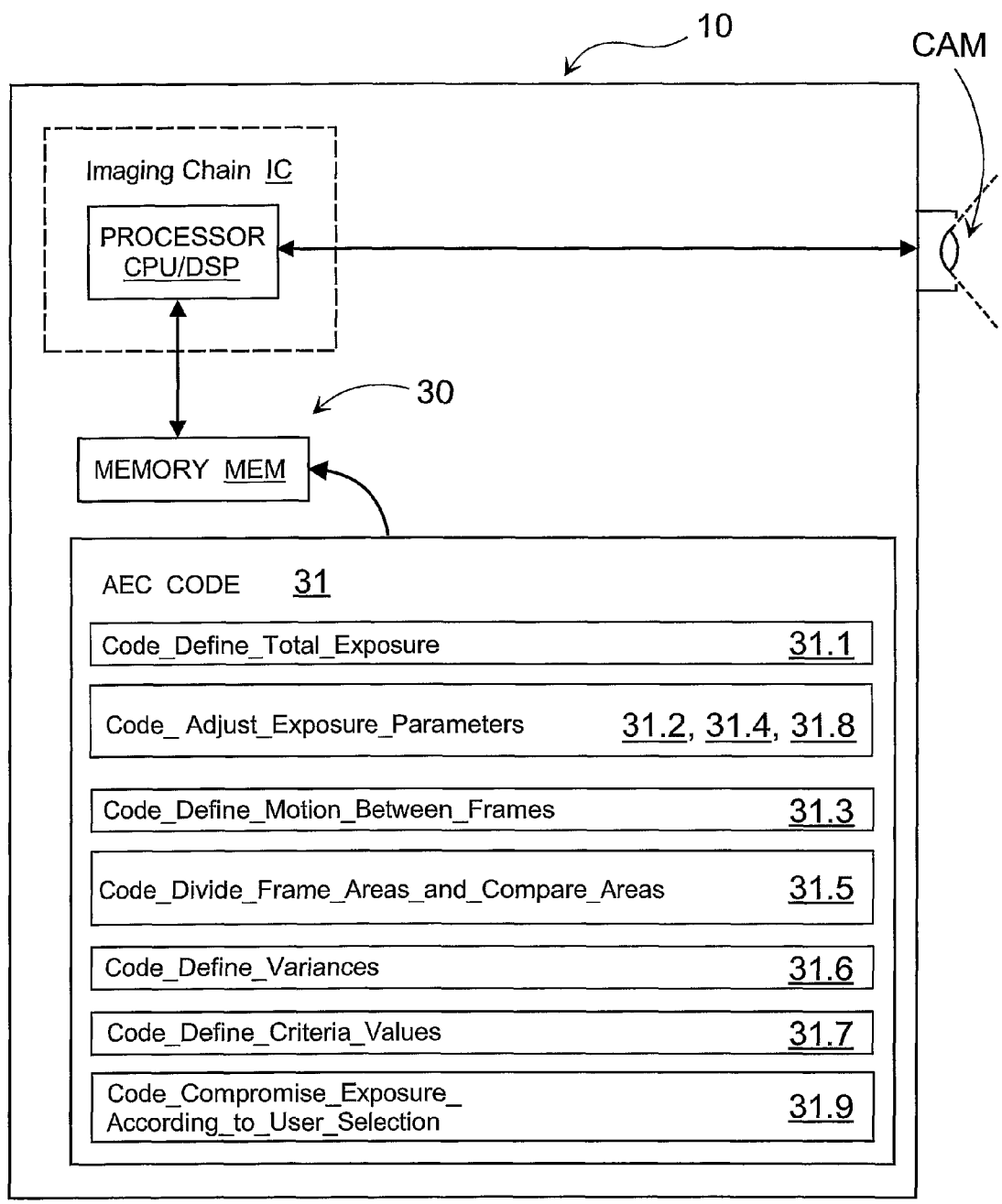
FIG. 2 shows an example of an application of the program product according to the invention for adjusting exposure in a manner according to the invention in electronic equipment.

FIG. 1 shows a block diagram of a schematic example of an application of electronic equipment 10 according to the invention, on the basis of which the invention will be described in the following. In addition, FIG. 2 shows an example of the program product 30 according to the invention, which forms of a storage medium MEM and program code 31 stored on it, the code means 31.1-31.9 belonging to which program code 31 are referred to in the following at suitable points in the description, in order to connect them to the method and system according to the invention.

The equipment 10 can be, for example, a digital camera equipped with a still and/or video imaging capability, a digital video camera, a mobile station, or some other similar smart communicator (PDA), the components of which that are not relevant in terms of the present invention are not described in greater detail in this connection. Besides the equipment 10, the invention also relates as much to an imaging-chain system IC, which can be, for example, in the equipment 10.

The equipment 10 according to the invention, and with it also the imaging system, can include, as modular components, camera means CAM and a digital imaging chain IC connected to them. The camera means can include an image sensor CAM and sets of lenses, which are as such known, which can be used to form sequential image frames FR0-FR4 from the subject being imaged. The image-processing chain IC can include modules, which are used, for example, for adjusting the parameters ET, AG, DG used in the imaging by the image sensor CAM, prior to the actual imaging (still-imaging/halfpress) intended for storage and/or also during the actual imaging to be stored (video imaging). In both cases, whether or not imaging for storage is being carried out at that moment using the equipment 10, so-called viewfinder imaging can be performed, for which the equipment 10 may have a dedicated module VF. In the context of the invention, such a module totality can be understood as an AEC control circuit.

The image-processing chain IC can consist of one or more processing circuits/DSP CPU, for which the processing/adjustment functions required by the invention are arranged. To one versed in the art, their technical implementation will be obvious and for that reason in this connection the invention is described at a very rough block-diagram level, for reasons of clarity. From the point of view of the practical implementation of the invention, equally hardware and software solutions will become into question, as well as combinations of both. In addition, one circuit can even handle several tasks, which is, of course, also obvious.

As modules, the image-processing chain IC includes means 11, 31.1 for determining the total exposure level EV. These can be used to determine the total exposure level EV of the exposure from the image frames FR0-FR4 . . . formed using the camera sensor CAM. It is not capable of, or worthwhile, or there may be no need to perform the determining for each image FR0-FR4 . . . formed using the image sensor CAM, instead it can be performed from only some of the frames. However, the intention is that the frames used in the determining should be, taking the conditions into account, as consecutive as possible. This will be returned to slightly later in the description. For example, some manner of determining that is, as such, known, or is still under development can be used in the determining of the total exposure EV. One example of such is disclosed in the applicant's PCT patent application PCT/2004/050091.

Another, surprising module, which also belongs to the system chain IC in the equipment 10 according to the invention, can be motion detecting means 13, 31.3. The module 13, 31.3 can be used to detect movement from the image frames FR1-FR4 . . . formed using the image sensor CAM. In this case too there is not necessarily any need/possibility to target the detection to every frame FR1-FR4 . . . formed using the sensor CAM, instead it can be performed in a set manner on consecutive frames FRp, FRc. In this case too, the intention is that the frames FRp, FRc should be, taking the conditions into account, as consecutive as possible. According to one embodiment, the previous and current frame FRp, FRc used for the motion detection need not even be the same as those used in the determination of the total level EV of the exposure.

Yet another module, which can also belong to the equipment chain IC, are the adjustment means 12, 31.2, 31.4, 31.8 of the exposure parameters ET, AG, DG. In this case, the exposure parameters can be, for example, the exposure time ET, analog gain AG, and digital gain DG. Together, the analog gain AG and the digital gain DG form the total gain G=AG*DG. Instead of, or as well as the gain AG, DG, the aperture size can also be applied. The replacement of the aperture size with the gain G will be obvious to one versed in the art and there is no need to review it further in this connection. The application of an ND filter, which can be directed in front of, or away from the sensor CAM, is also possible. It can be used to reduce the amount of light (the amount is filter-dependent). The module 12, 31.2, 31.4, 31.8 can be used to adjust the exposure parameters ET, AG, DG according to the invention, on the basis of the total exposure level EV of the exposure determined using the module 11, 31.1 and, surprisingly, also of the movement detected using the module 13, 31.3.

Figure 3:
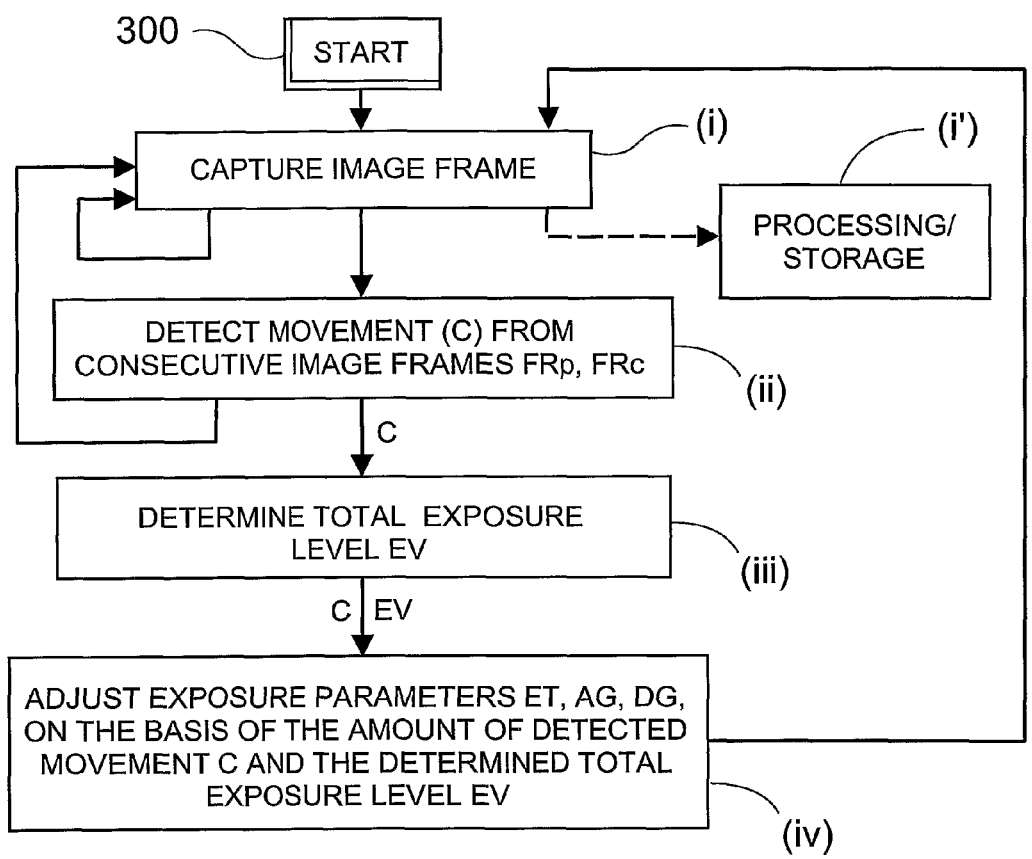
FIG. 3 shows a rough flow diagram of a schematic example of the method according to the invention.

FIG. 3 shows a rough flow-chart presentation of a schematic example of the method according to the invention, for adjusting exposure in digital imaging.

After the initiation stage 300 of the performance of the method, as a stage (i) consecutive raw-image frames FR0-FR4 . . . are captured, using the sensor CAM of the digital camera. In other words, in stage (i), in a set manner consecutive image frames FR0-FR4 . . . are formed using the set exposure parameters ET, AG, DG.

When the method is initiated, the exposure parameters ET, AG, DG of at least the first exposure iteration cycle are obtained from the default values of the equipment 10. After the following, or at least already a few exposure cycles, the exposure parameters ET, AG, DG are prepared using the method, to suit the current imaging situation, when the exposure ET, AG, DG is gathered according to the method.

In the method depiction shown, a start is made only just a few exposure cycles have already been performed. This is because in the first imaging cycles all of the elements (=which refers mainly to the 'previous' image frame FRp, which is required in the comparison of the 'previous' image frame FRp with the 'current' frame FRc) required in the embodiment depiction shown herein do not necessarily yet exist from the point of view of the invention. In a single performance cycle, the motion definitions and calculations of the invention can be performed for the frame FRc, which is applied in the method, and which is the last to be captured at that moment, i.e. precisely for that cycle. Factors (for example, variances, which will be examined later in greater detail) defined from the frame FRp in the loop in the previous cycle, can of course be stored in the memory MEM of the equipment 10, from where they can be retrieved, for example, for determining the amount of movement. In addition, the current exposure values ET, AG, DG, which the sensor CAM uses, can also be in the memory MEM.

In general, the image frames, FR0, FR1, FR2, FR3, FR4 . . . formed using the image sensor CAM, which are applied in the invention, are consecutive in a set manner. The consecutive frames FR0, FR1, . . . can be taken to the stage (i'), which includes, for example (post-)processing 14 of the image data. Post-processing is performed, for example, on the image data that is intended to be stored for storing of the image data, in the memory MEM, or to be taken to the viewfinder VF (FIG. 1). On the other hand, digital gain too can be performed only as post-processing.

When applying conventional imaging frequency, such as, for example 15-30 frames per second, the frames using by the method, or more particularly by the various sub-stages of the method (motion detection, exposure-level detection) need not necessarily be entirely consecutive, instead there can be, for example, a few frames between them. In addition, certain substages of the method can even use different frames. The sequentiality of the frames FRp (=for example, FR2), FRc (=for example, FR3) used is dictated by, for example, the processing speed of the equipment 10 and on the other hand, also by the requirements of the basic principle of the method of the invention, to which is already returned immediately in the following paragraph.

Motion detection can be performed from an image frame as the next sub-stage (ii). This will be returned to in greater detail later in the description, in the form of a more detailed application description. Motion can be detected from image frames FR2, FR3 which are consecutive in a set manner. The application of consecutive frames FR2, FR3, which follow right on each other, is not necessarily entirely possible, or even desirable in the invention, due, for example, to the limited reading speed of the sensor CAM, or an image frequency that is too high. In practice however, the image frequency is usually not so high as to prevent the use of fully consecutive frames. If the image frequency was really high, reasonable motion could not be detected from fully consecutive frames, instead a few frames would have to be omitted from between the current frame FRc and the previous frame FRp. In other cases, frames that are as consecutive as possible can be used (i.e. fully consecutive frames, unless this is restricted, for example, by the transfer speed of data from the sensor CAM to the memory MEM).

According to a surprising embodiment, the motion-detection stage (ii) can also be performed as its own continuous loop, independently of, for example, of the even the current performance situations of the exposure definition and adjustment stages (iii and iv). More generally, motion can be detected on the basis of the two most recent image frames FRp, FRc, irrespective of whether motion detection is performed as its own loop or as part of the exposure-adjustment loop.

If, for example, the image frame FR3 (=FRc) were to be exposed using the exposure adjustments calculated on the basis of the image FR1, then when calculating the new exposure adjustments for the image FR5 on the basis of the image FR3 (=FRc), it is nevertheless possible to use the data of the previous image frame FR2 (=FRp) in the detection of motion, which is calculated from the image frame FR2 and not the image frame FR1, on the basis of which the previous exposure adjustment was performed. Altered exposure parameters do not cause problems for the detection of movement when comparing with each other image frames formed using different exposure parameters.

The reading speed of the image frames from the sensor CAM can be, for example, 15/30 fps. However, to be able to also permit long exposure times, it is possible to actually read out the image from the sensor CAM, for example, only every fourth possible time, in which case the real image frequency will be only 3,75/7,5 fps. In any event, in this connection the consecutiveness of the frames FRp, FRc refers to the fact that they are either fully consecutive, i.e. follow each other, for example, when FRp=FR2 and FRc=FR3, or else there are possibly one or more frames between them (for example, FR2 and FR3), which are not taken into account in terms of the method (i.e. when FRp=FR1 and FRc=FR4). As already stated above, consecutiveness can be understood differently when providing frames, for example, for motion detection (ii), or for exposure adjustment (iii).

It is also always worthwhile offer image frames to the exposure-adjustment algorithm 11 that are as consecutive as possible. If the adjustment algorithm functions sensible, then it will when necessary leave the exposure parameters as they were, if the latest image frame has not yet been exposed according to the most recently calculated exposure parameters. How many image frames are between the consecutive exposure calculations (0 . . . n) will depend on the sensor CAM and may also vary for the same sensor at different moments in time. For example, for a typical CMOS sensor there should generally be at least one image frame between, because the next image frame will have already been begun to be exposed when the preceding image frame has been able to be read. An attempt is also made to detect motion from image frames that are as consecutive as possible, unless the imaging frequency is too high, in which case the necessary number of image frames is omitted between the current frame FRc and the previous frame FRp.

The current image FRc applied in motion detection 13 can be, for example, FR3 and in this connection the previous image FRp refers to the image that was last processed and from which the values have been calculated to the memory MEM. Thus, in this case the previous image FRp can be, for example, the image FR2, which also refers to the previous image in sequence. Of course, the previous image can also be the image FR1 or the image FR0, if it has not been desired or caught to process all the images, or if they are not wished to be used in the implementation according to the invention.

The following sub-stage (iii) of the method to be performed can be the definition of the required total exposure level EV of the exposure, for example, from the image frame FR3. In it, the total exposure level EV (Exposure Value) required can be determined using the AEC algorithm 11, 31.1 of the equipment 10, which according to one embodiment can be, for example, the product EV=ET*AG of the exposure time ET and the analog gain AG. It should be understood that the location of the performance of this sub-stage is in no way fixed in the invention, instead it can even be carried out before the motion-detection stage (ii). On the other hand, this stage can also be combined with the motion-detection stage (ii), to form a single common sub-stage. In order to perform this function, for example, the method disclosed in the PCT application referred to earlier in the specification, in which the saturation of the pixels, for instance, is well controlled, can be applied. However, there is reason to note that any AEC algorithm whatever can be used in this stage. The details of the sub-stage (iii) in question do not affect the invention.

Stage (iii) is followed by stage (iv), in which the exposure parameters ET, AG, DG are adjusted. This takes place using the total exposure level EV of the exposure defined, for example, from the last image frame FR3 and surprisingly also on the amount of movement C detected between the previous image frame FRp and the current image frame FRc.

Once the exposure parameters ET, AG, DG have been adjusted, it is then possible to return from stage (iv) to the image-frame capture stage (i). In it, the sensor CAM is used to capture the next frame in the imaging sequence, using the new exposure parameters ET, AG, DG possibly defined above. The following frame captured using the possible new exposure parameters ET, AG, DG can be set to be the current frame FRc of the motion detection and the current frame of the motion detection that is terminating, or more particularly the values required in the method of the invention determined from it (for example, variances) are set to be the previous frame (FRp) of the motion detection.

Because the method can be applied in both still imaging and video imaging, the loop of the kind described above runs in practice the whole time that the camera CAM is being used to form image information, both purely for the viewfinder VF and also for storage MEM, and, even more generally, when the camera function of the equipment 10 is active. The invention includes stages (ii) and (iv). In terms of the invention, the processing order of stages (ii) and (iii) is not important. This means that stages (ii) and (iv) can be combined, if this is advantageous in terms of the invention (if, for example, having two modules would be in some way detrimental to the total system).

The calculation of the statistics required at least for adjusting the exposure can take place from a raw image (as can motion detection). On the other hand, they (particularly motion detection) can also be implemented for an already processed image.

Figure 4A:
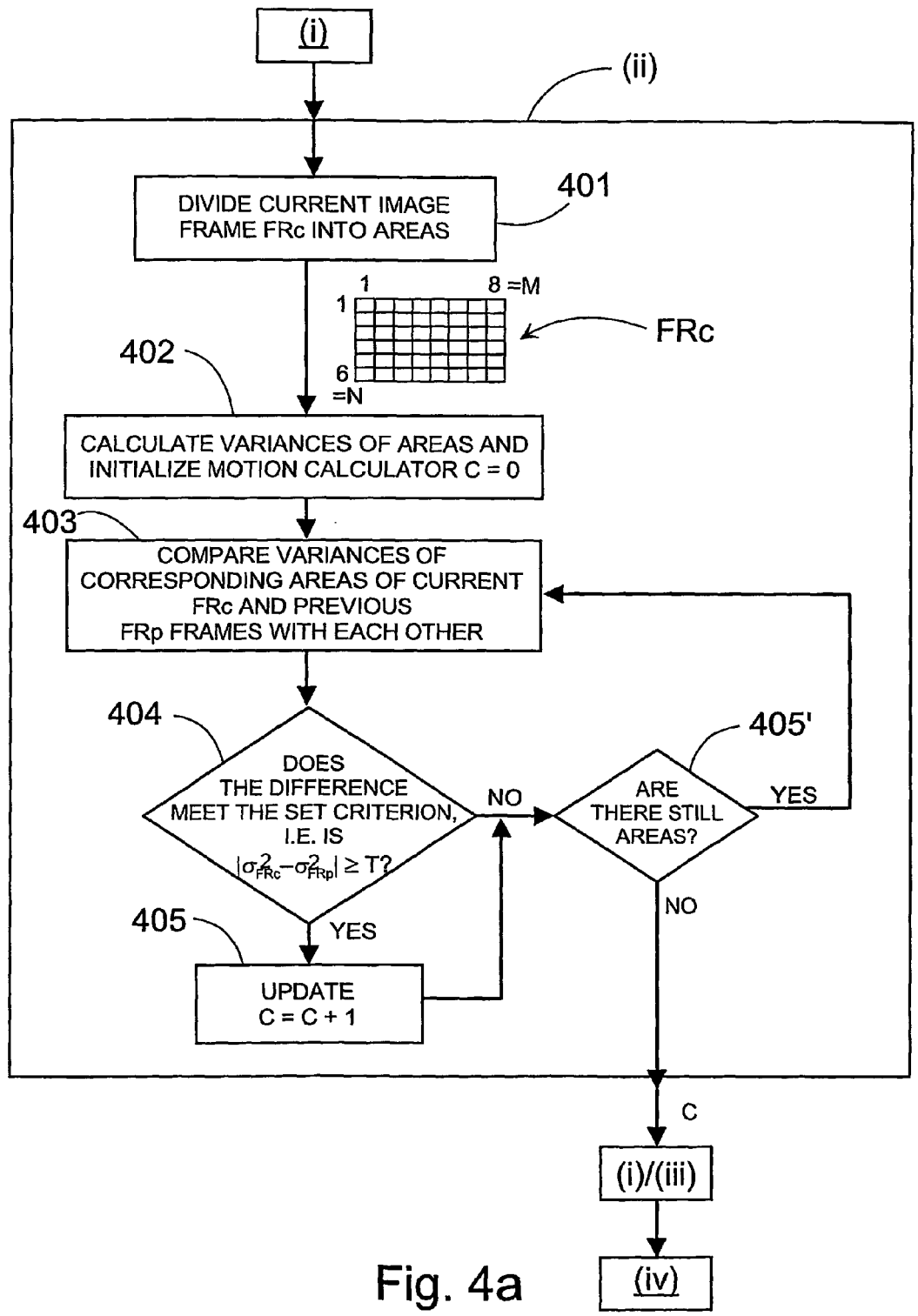
FIG. 4a shows in greater detail a schematic example of an application of one sub-stage of the method according to the invention.

FIG. 4a shows a slightly more precise embodiment of the motion-detection sub-stage (ii) of the method according to the invention. The basic forms of the sub-stages (i-iv) that have already been described above will not be unnecessarily reconsidered.

According to one embodiment, in stage (ii) the image frames FRp, FRc can be divided as a sub-stage 401 each in its own processing cycle in a set manner, for example, into (M×N) areas corresponding to each other. The program product 30 contains code 31.5 for this purpose, to be executed on the processor CPU. These areas can then be compared with each other, in order to detect movement between the consecutive image frames FRp, FRc.

According to one embodiment, the image frames FRp, FRc can be divided, each in its own processing cycle, for example, evenly into an M×N block. In this case, M is the number of blocks in the horizontal direction and N is the number of blocks in the vertical direction. The shape of the blocks can be, for example, rectangular. One example of the number of blocks that can be given is M=8 and N=6. More generally, the number of the blocks can be, for example M∈[1, columns of the image] and N∈[1, lines of the image]. In practice, at least the upper limits can be narrowed from the greatest possible theoretical value, so that the amount of memory required is kept reasonable. The range of variation of the blocks can then be, for example, M∈[4, 256] and N∈[3, 192]. By keeping the number of blocks reasonable, it is possible to speak of the changes taking place in the areas formed by the pixels, instead of the pixel values, i.e. now of the variances of the areas and not, for example, of the differences of the pixel values. The lower limits can be M,N=1 even in both directions, as in terms of calculating technique the calculation of the variance of the image for one block is extremely rapid (if the histogram of the image is otherwise collected) and thus it can be already used as a rough forecast of the movement.

According to one embodiment, it is not coercion to exploit the entire image area of the frame FRp, FRc. In fact, if the image cannot be divided evenly, for example, by the desired number of blocks, then in terms of calculation technique the size of the block can be limited to a value indicated by an integer (or an even integer). The area outside the blocks can then be left unexploited in the calculations of the motion detection.

Next, as sub-stages 402-405, it can be, for example, determined from each in a set way consecutive image frames FRp, FRc the changes appearing in areas corresponding each other. One way of doing this is to define some suitably selected statistical number, by means of which the movement of the image subject/equipment 10 between the frames FRp, FRc can be identified, or a statistical number expressing the amount of movement. One example of such a statistical number can be the variance $\sigma^2$ of the areas. The variance can be calculated for at, least some of the areas.

The variance $\sigma^2$ can be calculated, for example, using code 31.6 belonging to the program product 30 and executed using the processor CPU, for example, for each block of both frames FRp, FRc, or at least for some of the blocks. As is known, the mathematical definition of the variance $\sigma^2$ is:

$$\sigma^2 = \frac{1}{n}\sum_{i=1}^{n}(x_i - m)^2$$

in which m is the mean value:

$$m = \frac{1}{n}\sum_{i=1}^{n}x_i$$

and in which i∈[1,n] is the index for each pixel value $x_i$ in the block j∈[1, M×N]. The pixel values can, as is known, vary, for example, in the range 0-0.255.

As the following sub-stage 403, the variances of areas of the current frame FRc and the previous frame FRp that correspond to each other can be compared with each other in a set manner. The comparison can be performed, for example, by calculating the difference of the variances of areas that correspond to each other, or their ratio, for example, using code means 31.5, for at least some of the variances. In sub-sub-stage 404, it is possible to determine whether the variance $\sigma^2_{jFRp}$ of block j in the current frame FRc differs from the variance $\sigma^2_{jFRp}$ of the corresponding block j of the previous frame FRp when compared in a set manner.

If a sufficient difference is not detected in stage 404, a move can be made to stage 405'. In it, it is determined whether there are still remaining image blocks to be compared. If there are image blocks that have not been compared, a return can be made to stage 403.

If the variances of the areas $j_{FRp}$, $j_{FRc}$ corresponding to each other of the image frames FRp, FRc differ in stage 404 from each other in the set manner, i.e. the special criterion condition T set for the comparison is met, then the detected motion is taken into account. It is then possible to move to the following sub-sub-stage 405. In it, the indicator of the amount of movement is increased in a set manner.

It is not necessary to take all the colour components (if the colour system is, for example, RGB) into account in the motion detection, though of course this too is possible. According to one embodiment, movement can be detected, for example, from only the green colour component G. It is advantageous to select the green component G for motion detection, inasmuch as it is closer to the luminance component than red R or blue B.

According to one embodiment, the difference investigated in stage 404, can be defined as a threshold value T, which will be exceeded due to movement appearing in the image subject. The criterion condition T for the differences in variance can be, for example, T=D/8 and T∈[D/12, D/4]. In this case, D is the number of quantization levels of the values of the G component of the pixels, on the basis of which the variance is calculated. This need not necessarily be the same to which, for example, the bit depth of the input image corresponds. If the input image was, for instance, 24 bpp, i.e. 8 bits per component, in which case the values of the components of the pixels would be in the range 0 . . . 255, i.e. there would be 256 quantization levels, then the variance could be calculated more approximately using, for example, only the four uppermost bits, so that D=$2^4$=16.

In stage 405, the numerical value, the 'motion calculator' C indicating the amount of movement between the frames FRp, FRc can be defined in the method to be, for example, C∈[0, M*N]. In stage 405, it can always be increased by one, until the absolute value of the difference of the variances $\sigma^2_{jFRp}$, $\sigma^2_{jFRc}$ of the blocks $j_{FRp}$, $j_{FRc}$ corresponding to each other exceeds in one block j the threshold value T set for it. The comparison of the variances $\sigma^2$ is then performed between blocks $j_{RFp}$, $j_{FRc}$ corresponding to each other in the frames FRp, FRc. It is possible to move to stage 405' from the increase stage 405.

The indicator indicating the amount of movement, the motion calculator C, i.e. the number of blocks subject to change compared to the previous frame FRp, is a measure of movement, which is the input value from the motion definition module 13, 31.3. The amount of movement, which can be detected, i.e. the resolution of the movement definition module 13, 31.1, can be adjusted using the number of blocks (variables M and N) and the variation sensitivity in the variance $\sigma^2$ can be adjusted using the threshold parameter T.

The motion detection described above is surprisingly simple in terms of calculation, but is nevertheless sufficiently good to create sufficient robustness for the operation of the method. Small moving image subjects will cause a smaller effect than larger moving areas. In this case, the low level of complexity of the calculation is an important property, because the motion detecting module 13, 31.1 is part of the real-time system IC and the processing power of the equipment 10 is limited. This achieves, however, good results, as can be easily seen from the image collages of FIGS. 8a-8d and 9a-9d referred to later. In addition, the variances can be calculated from the pixel data that is already available, for the definition of the total exposure.

Once it has been discovered in stage 405' that there are no more areas j to be compared, then next a step can be made to the partition 12, 31.2, 31.4, 31.8 adjusting the exposure parameters, i.e. to stage (iii) of the method. At the same time, a change of variable concerning the variances can also be performed. In it, the variances $\sigma^2_{jFRc}$ of the current frame FRc are set to be the variances $\sigma^2_{jFRp}$, of the 'previous' image frame FRp in the following performance cycle. This is also important in terms of the use of memory in the equipment 10. It is now sufficient, that, from the previous image frame FRp, the memory MEM contains only the variance values $\sigma^2_{jFRp}$, which take up little space and which are needed to detect movement between the image frames FRp, FRc. If motion detection that is independent of the exposure calculation phases is applied, then the variance values $\sigma^2_{jFRp}$, of the previous frame FRp, which have then not yet been used, are stored in the memory MEM for the next exposure adjustment cycle.

Figure 4B:
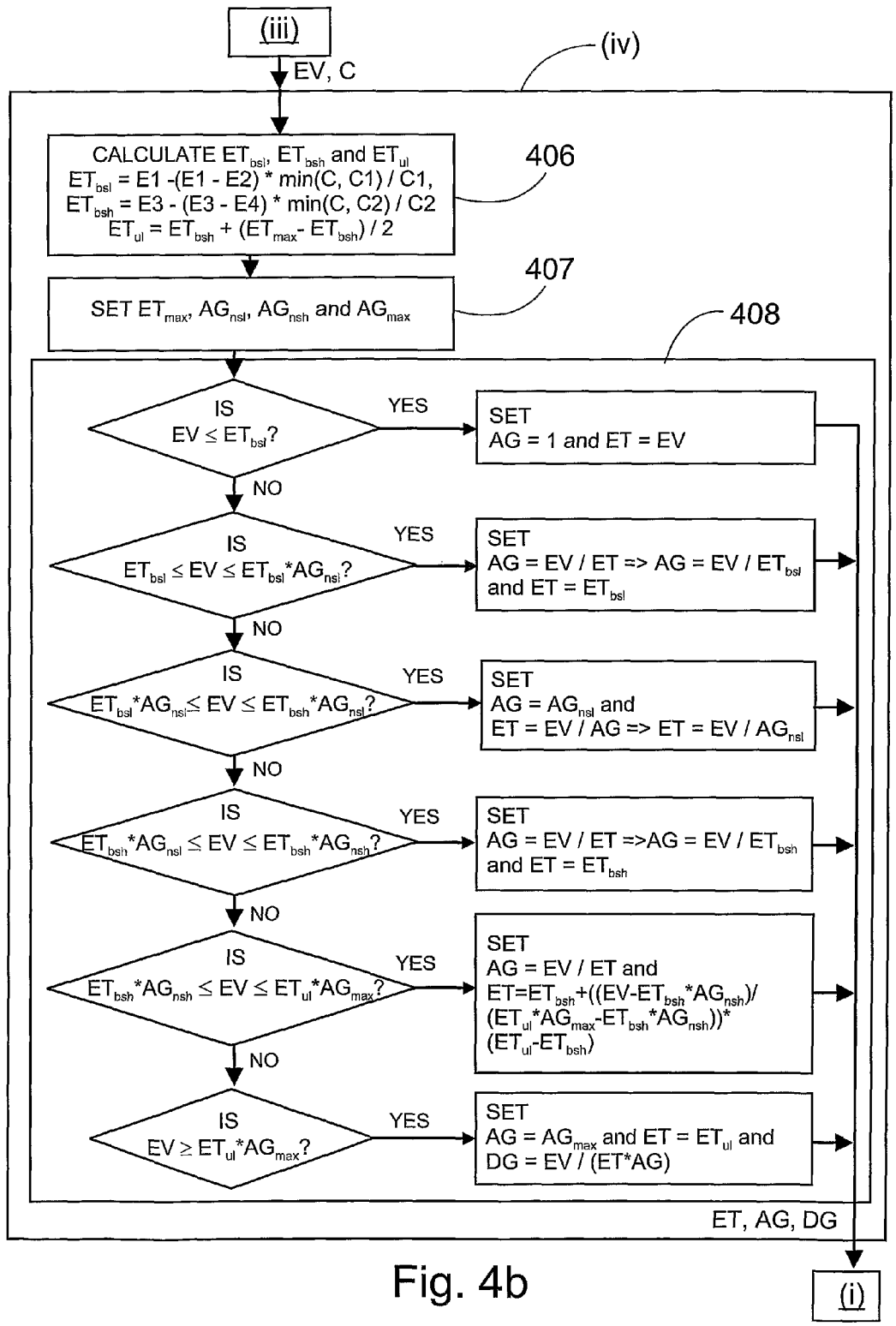
FIG. 4b shows in greater detail a schematic example of an application of a second sub-stage of the method according to the invention.

FIG. 4b shows stage (iv) is greater detail. In stage (iv), the combination of exposure time ET and analog gain AG, which in this case form the required total exposure level EV, are calculated in consecutive frames FRp, FRc, taking the detected motion into account. According to the main principle of the invention, a very small movement will cause a longer exposure time ET and less analog gain AG, more generally gain G, if the digital-gain coefficient DG is set to be 1. Correspondingly, a large movement will cause a shorter exposure time ET and more analog gain AG to be used.

Figure 5:
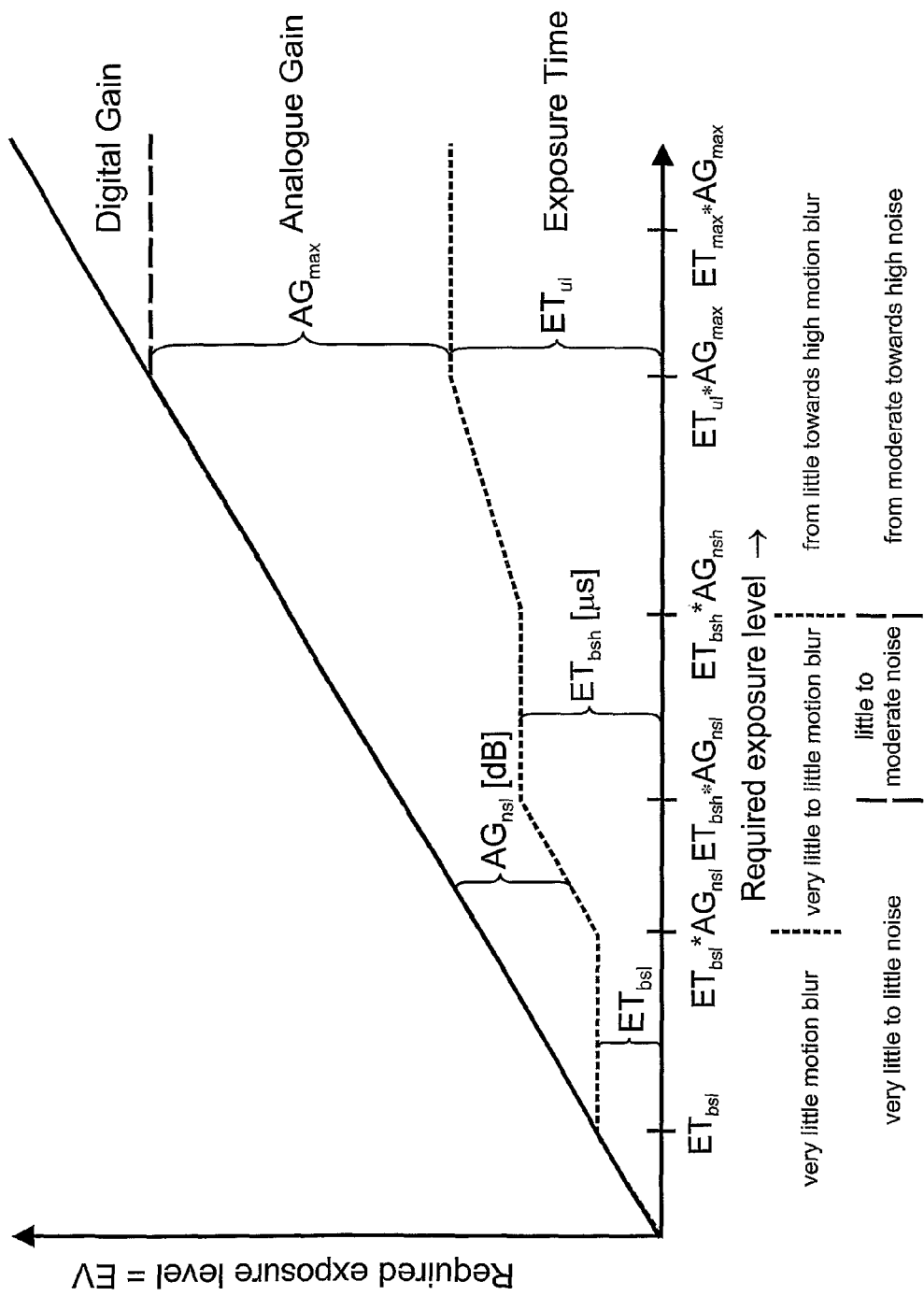
FIGS. 5-7 show various examples of applications of the formation of total exposure, in various imaging situations.
Figure 6:
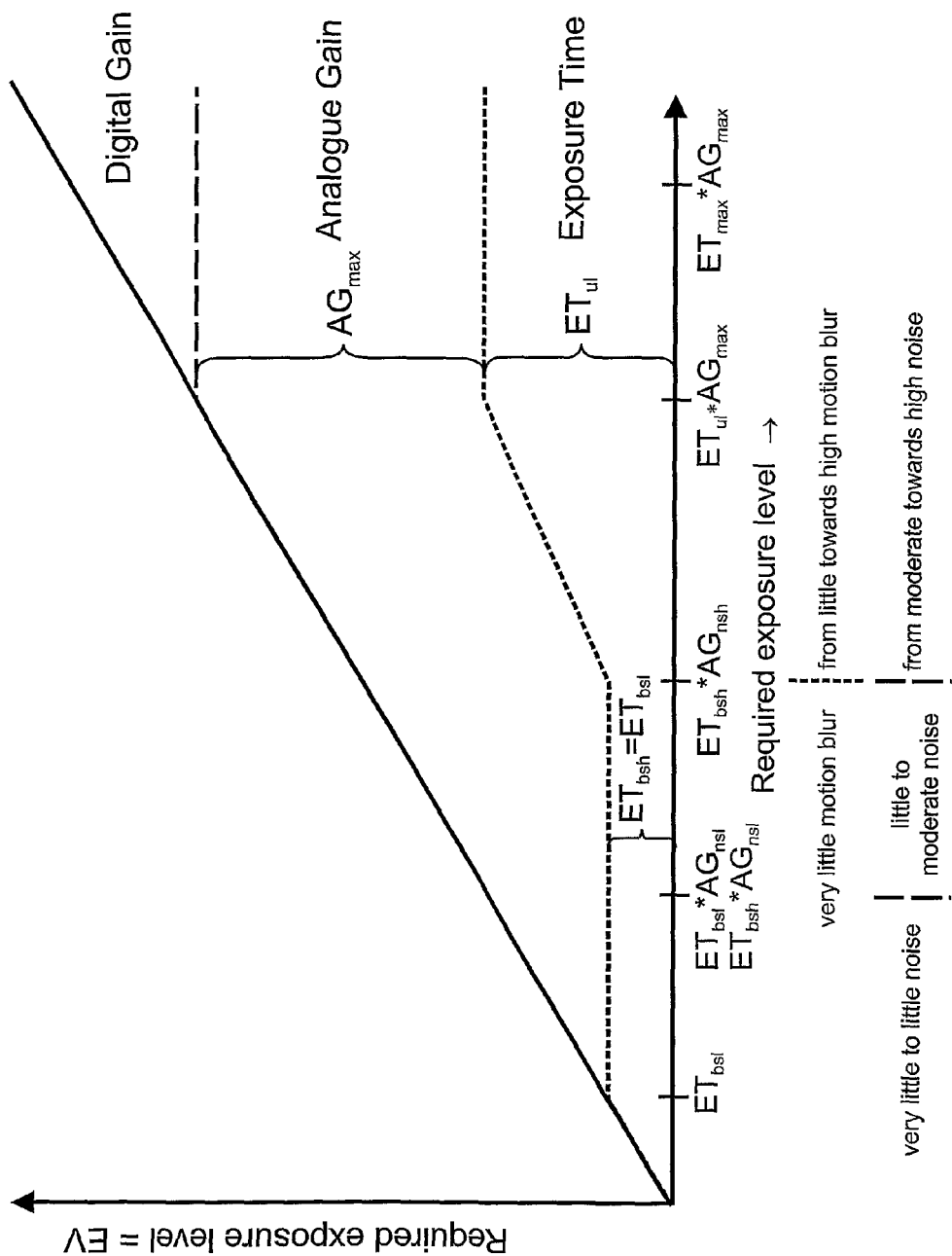
Figure 7:
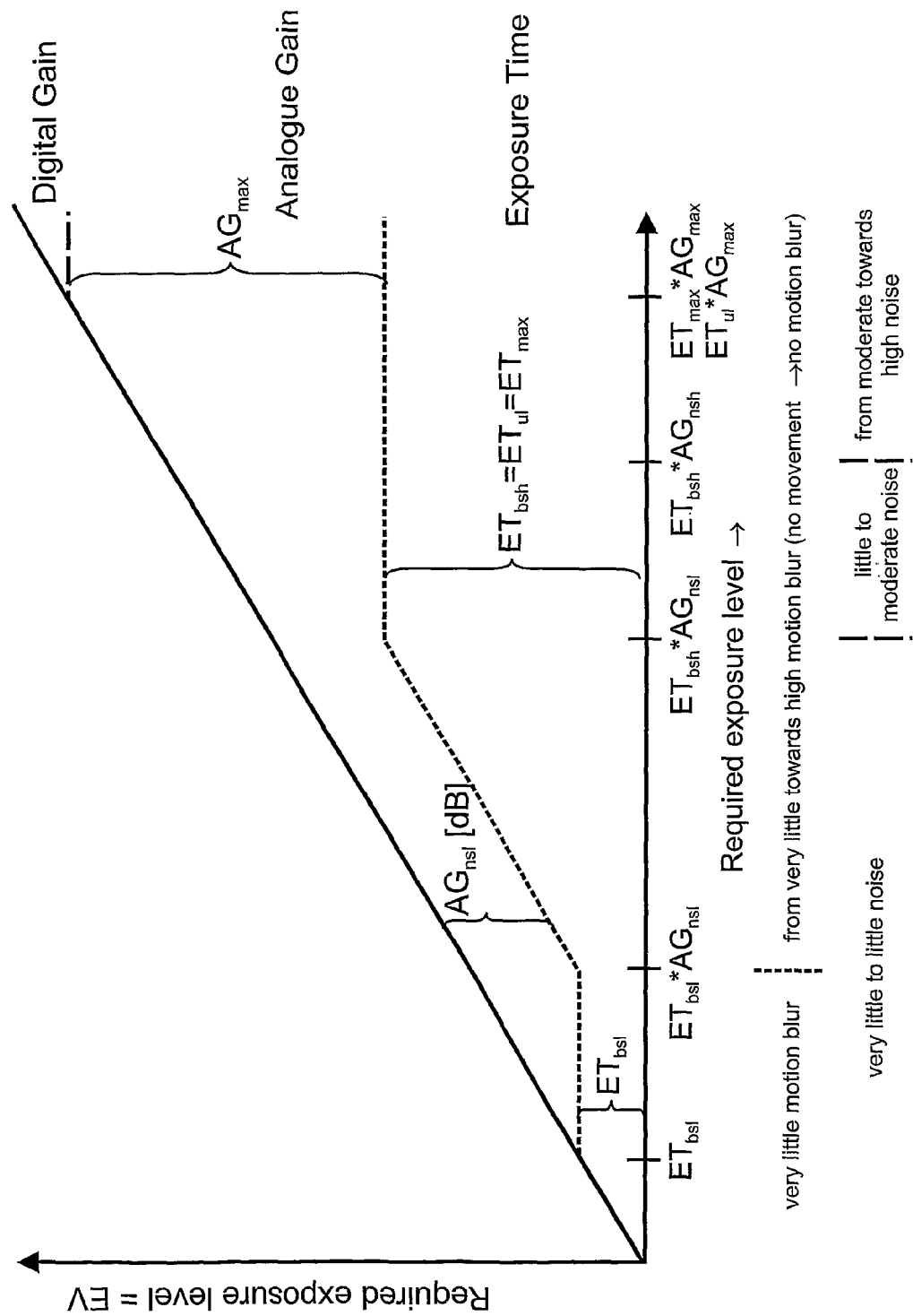

In stages 406 and 407, specific criterion values are defined and set for the exposure time ET and the analog gain AG. For this purpose, there is code 31.7 in the program product 30, to be executed by the processor CPU. At least part of the criterion values of at least the exposure time ET depends on the amount of movement C detected in stage (ii). At first, these criterion values relating to the invention are examined, with the aid of which the invention is later described in greater detail and to which FIGS. 5-7 are also referred.

$ET_{bsl}$: The exposure time, which is safe in terms of motion blurring (depends on the detected motion), $ET_{bsh}$: The exposure time, which is relatively safe in terms of motion blurring (depends on the detected motion), $ET_{ul}$: Upper limit to exposure time (depends on the detected motion), $ET_{max}$: Maximum available exposure time (sensor-dependent), $AG_{nsl}$: Analog gain, which is safe in terms of noise (sensor-dependent), $AG_{nsh}$: Maximum analog gain, which is permitted to be used to prevent motion blurring (sensor-dependent), $AG_{max}$: Maximum possible analog gain (sensor-dependent).

The input parameters of sub-stage (iv) are as follows:

1) Required total exposure level (output value obtained from the previous sub-stage (iii), marked with the reference EV) and 2) Detected movement (output value obtained from the motion-detecting sub-stage (ii), marked with the reference C).

From sub-stage (iv) the following output values are obtained:

1) Exposure-time value ET,
2) Analog gain value AG, and
3) (Digital gain value DG).

The exposure time $ET_{bsl}$ that is safe in terms of motion blurring is calculated and set in such a way that it maps to E1, if movement (C=0) is not detected between the frames FRp, FRc and to E2, when a maximum movement (C=C1) according to a specific set criterion is detected between the frames FRp, FRc, in which C1 can, according to one embodiment, be, for example, C1=M*N/4. Thus, $ET_{bsl}$=E1−(E1−E2)*min (C, C1)/C1, in which C1=M*N/4, in which M=the number of areas in a horizontal direction and N=the number of areas in a vertical direction.

E1 is now the exposure time that is estimated to be safe in terms of motion blurring, when stationary subjects are imaged freehand. This depends, for example, on the pixel size of the sensor CAM and the design of the equipment 10. One example of the E1 value can be, for example, 1/50 s, more generally E1∈[1/100 s, 1/25 s]([1/500 s, 1/2 s]). The function min(C, C1) returns the smaller of the values C and C1. More generally, applying the minimum function achieves the criterion values being able to be dependent of the amount of movement, but that they do not exceed a specific maximum level, even if the amount of movement increases to become large.

E2 is now the exposure time that is estimated to be safe in terms of motion blurring, when moving image subjects are imaged. One example of the E2 value can be 1/125 s, more generally E2∈[1/200 s, 1/50 s]([1/800 s, 1/2 s]) and in which E1>E2. However, the value of E2 is preferably not set to an absolute safe value, such as, for example, 1/1000 s, because this will usually demand too great analog-gain capabilities from the sensor CAM. In the method, very small exposure times, such as, for example, 1/1000 s, can be used automatically, for example, if there is enough light. In low-light conditions, however, a compromise must be made between motion blurring and noise, because an automatic system cannot assume that the user will always prefer noise to motion blurring.

2) The exposure time $ET_{bsh}$ that is relatively safe in terms of motion blurring is calculated and set in such a way that it maps to E3, when no movement (C=0) is detected between the previous and current frames FRp, FRc and to E4, when maximum movement (C=C2) according to a specific set criterion is detected between the frames FRp, FRc, in which C2 can be, according to one embodiment, for example, C2=M*N/3.

Thus, $ET_{bsh}=E3-(E3-E4)*\min(C,C2)/C2$, in which
$E3=ET_{max}$, in which
$ET_{max}$=sensor-specific maximum exposure time, which can be, for example, $ET_{max}=1$ s, more generally $ET_{max}\in$ [1/30 s, 30 s],
$E4=ET_{bsl}$ and in which E3>E4.

The above means that as the amount of light diminishes, more movement is required to be able to use as short an exposure time as in bright conditions, and that in low-light conditions it is possible to use a very long exposure time with low analog gain, if neither the camera equipment 10 nor the subject moves.

3) The upper limit to the exposure time can set to be, for example, $ET_{ul}=ET_{bsh}+(ET_{max}-ET_{bsh})/2$, or it can be $ET_{ul}=ET_{max}$. This means that in very low-light conditions both motion blurring and noise may appear. Motion blurring can no longer be prevented at this exposure level without disturbing noise appearing in the image. At this lighting level both the exposure time ET and the analog gain AG are increased, in order to expose the image properly. A compromise must then be made between motion blurring and noise.

The criterion values of the gain G, in this case analog gain AG, can be set to be:

4) $AG_{nsl}=x1\ldots x8$ (+0 dB $\ldots$ +18 dB), for example, x2,
5) $AG_{nsh}=x1\ldots x16$ (+0 dB $\ldots$ +24 dB), for example, x4,
6) $AG_{max}=x1\ldots x32$ (+0 dB $\ldots$ +30 dB), for example, x8, and in which $AG_{nsl}<=AG_{nsh}<=AG_{max}$.

It should be noted, that the invention can also be used in cases in which it is not possible to use the camera sensor CAM with analog gain AG (i.e. $AG_S=x1$). In such cases, the analog gain. AG is replaced with digital gain DG. However, the final result will then not be as good as with a sensor CAM with which analog gain AG can be used.

In addition, it should also be noted that the values for C1 and C2 given above are example values. They can naturally be altered, for example, according to the desired adjustment and/or the properties of the sensor CAM. C1 and C2 can then be varied, for example, in the range M*N/8 ... M*N. I.e. in practice, if C1 and/or C2 are smaller than M*N, then the maximum adjustment will already be achieved before the greatest possible number of blocks (=M*N) have been detected to be moving.

Once the criterion values have been calculated, a step is made to stage 408. In it, the exposure parameters to be used, i.e. the exposure time ET, the analog gain AG, and the possible digital gain DG are calculated using the total exposure level EV and the criterion values $ET_{bsl}$, $ET_{bsh}$, $ET_{max}$, $ET_{ul}$, $AG_{nsl}$, $AG_{nsh}$, and $AG_{max}$ defined in the previous stage. The total exposure level EV can be expressed in the same unit as the exposure time (for example, in microseconds). The analog gain AG can be expressed, for example, as a coefficient, instead of in decibels. FIGS. 5-7 show the relationship between the exposure time ET and the analog gain AG as functions of the required total exposure level EV in different situations.

In the invention, the total exposure level EV and the exposure parameters ET, AG fulfil the following kind of relation:

$EV=ET*G$, in which $G=AG*DG$

The parameters ET, AG can be set according to the value areas defined by the criterion values defined above, as follows, depending on the total level EV of the exposure and the amount of detected movement C. More generally, it is possible to refer to the product $EV=ET*G$ of the exposure time ET and the gain G, in which the gain $G=AG*DG$. In the examples of applications, the coefficient 1 (=0 dB) is set as the default value of the digital gain DG, when G=AG, in which case mainly only analog gain is worked on. In addition, it should be further noted that digital gain DG, if it must be, or is wished to be used, can be performed at several points in the processing chain (at the sensor CAM, or only in the processing 14).

Here, reference is also made to the graphs showing the basic principles in FIGS. 5-7, in which different situations are depicted, relative to the amount of movement detected in the image. In the graph of FIG. 5, there is some degree of movement in the shot, but not, however the maximum amount C2. In the adjustment of the exposure time ET and the analog gain AG described below in greater detail, reference is made to precisely the case according to this FIG. 5. In the graph of FIG. 6, a great deal of movement has been detected, compared to the case of FIG. 5. In addition, it should also be noted that the values shown for C1 and C2 mean that the maximum adjustment is already reached before C=N*M. At this point, the maximum amount also behaves in this way, as all amounts greater than C2 act as shown by the graph of FIG. 6. In the graph of FIG. 7, there is no movement in the shot, compared, for example, to the cases of FIGS. 5 and 6.

In the graph of FIG. 6, the products $ET_{bsl}*AG_{nsl}$ ja $ET_{bsh} AG_{nsl}$ lie at the same point on the X-axis, because, according to the above criterion value definitions, they elicit the same value when the amount of detected movement C is at the maximum level. The lower parts of FIGS. 5-7 also show estimates of the relative amounts of motion blurring and noise at each period of exposure time ET and analog gain AG. These estimates can be easily attached to the AEC program concept according to the invention which application is described in greater detail in the end of the description. In connection with this, reference is made to the code means 31.9 of the program code 31.

1) In the value range $[0, ET_{bsl}]$ of the total exposure level (EV), as the coefficient value of the analog gain AG is fixed to be 1 (=+0 dB) and the exposure time (ET) is set at a value (EV) corresponding to the total exposure level.

2) In the value range $[ET_{hsl}, ET_{bsl}*AG_{asl}]$ of the total exposure level (EV), as the value of the exposure time is fixed to be $ET_{bsl}$ and the coefficient value of the analog gain AG is set to be $AG=EV/ET=EV/ET_{bsl}$. The gain AG then increases from the coefficient 1 (=+0 dB) to the value $AG_{nsl}$.

3) In the value range $[ET_{bsl}*AG_{nsl}, ET_{bsh}AG_{nsl}]$ of the total exposure level (EV), as the value of the analog gain AG is fixed to be $AG_{nsl}$ and the exposure time (ET) is set to be $ET=EV/AG=EV/AG_{nsl}$. The exposure time ET then increases from the value $ET_{bsl}$ to the value $ET_{bsh}$.

4) In the value range $[ET_{bsh}*AG_{nsl}, ET_{bsh}*AG_{nsh}]$ of the total exposure level (EV), as the value of the exposure time (ET) is fixed to be $ET_{bsh}$ and the coefficient value of the analog gain AG is increased from the value $AG_{nsl}$ to the value $AG_{nsh}$, in such a way that $AG=EV/ET=EV/ET_{bsh}$.

5) In the value range $[ET_{bsh}*AG_{nsh}, ET_{ul}*AG_{max}]$ of the total exposure level EV, the value of the exposure time ET is increased from the value $ET_{bsh}$ to the value $ET_{ul}$, in such a way that $ET=ET_{bsh}+((EV-ET_{bsh}*AG_{nsh})/(ET_{ul}*AG_{max}-ET_{bsh}*AG_{nsh}))*(ET_{ul}-ET_{bsh})$ and the coefficient value of the analog gain AG is increased from the value $AG_{nsh}$ to the value $AG_{max}$, in such a way that $AG=EV/ET$.

In the ET statement of section 5), $ET_{bsh}$ can be considered to be a kind of bias level, on top of which are added the difference between the maximum exposure time and the bias level ($ET_{ul}$–$ET_{bsh}$) multiplied by a constant. The constant is between 0 and 1 and depends on how great the value of the total exposure EV is.

6) If the required total level EV of the exposure exceeds the value $ET_{ul}*AG_{max}$, then in that case $ET_{ul}$ is fixed as the value of the exposure time ET and $AG_{max}$ is fixed as the coefficient value of the analog gain AG and the final exposure is performed using digital gain DG. If digital gain DG is used instead of, or along with analog gain AG, then in the above development reference can be made more generally to gain G, instead of AG.

Digital gain can be performed at different points in the chain IC. According to a first embodiment, it can be performed on the camera sensor CAM, in which the gain DG is modified. According to a second embodiment, in which it is possible to make the digital gain DG even more optimally, it can be performed only in connection with the image processing in the module 14. Some examples of stages can be the pre-amplifications of the colour components, or in connection with the adjustment of the white balance. By delaying the digital gain until the processing stage of the captured image, i.e. the image that is intended to be stored i.e. after the actual imaging stage, both calculation is saved and the amount of quantization is reduced to integers. When proceeding in this way, the digital gain DG need not be altered at all at the sensor CAM, even in this situation.

Stage 408 results in a well adjusted exposure time ET, analog gain AG, and possible digital gain DG.

In the above description of the method, there is no reference to, for example, to the stability-specific, or sensor-specific parts, for example, limitations, which the actual camera sensor sets for the control system. These include the discrete adjustments of the sensor's analog gain and exposure time, and the elimination of possible flicker of the light source from the image, for which planning of the total exposure time is required, with both a global and a rolling shutter. It should be noted, that an actual implementation will include components that are not described in this connection. The implementation of these components will be, however, obvious to one versed in the art, so that it is not felt necessary to den scribe them in greater detail in this connection. In addition, they do not affect the basic idea of the invention. In fact, the basic idea of the invention can be applied in a large scale with these other components that are required by a real exposure-adjustment chain.

Further, FIGS. 8a-8d and 9a-9d show some examples of real images, in which the effects obtained by the invention in imaging are demonstrated on a very illustrative level. The example images were shot using a prototype mobile station of Nokia's model 6600, using a Toshiba Mirage 1 camera sensor. The adjustment of the exposure was performed using the method according to the invention, described above.

Figures 8A, 8B, 8C, 8D:
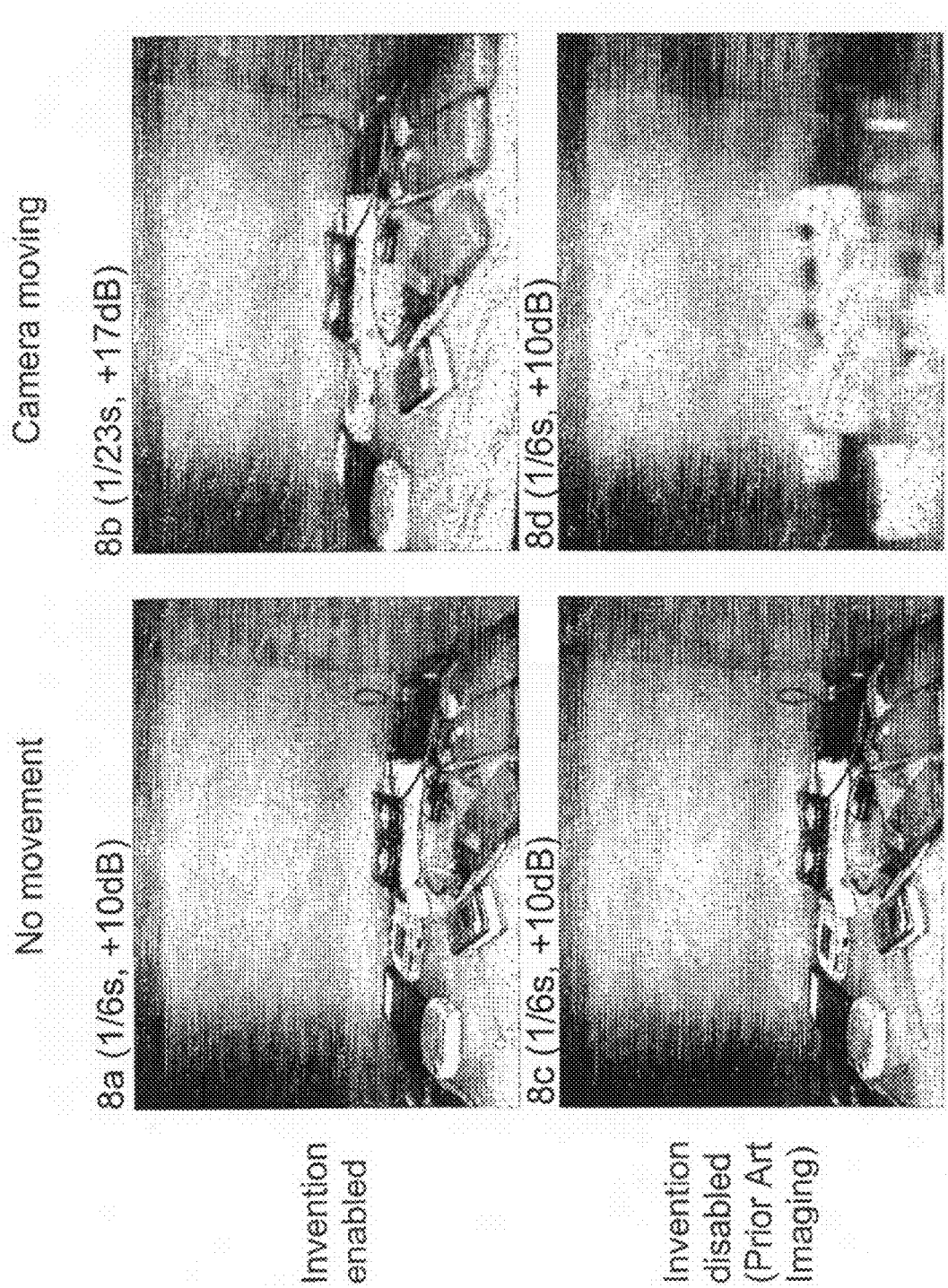
FIGS. 8a-8d show image collages of low-light imaging situation, in which image shots produced according to the method of the invention are compared with image shots according to the prior art.
Figures 9A, 9B, 9C, 9D:
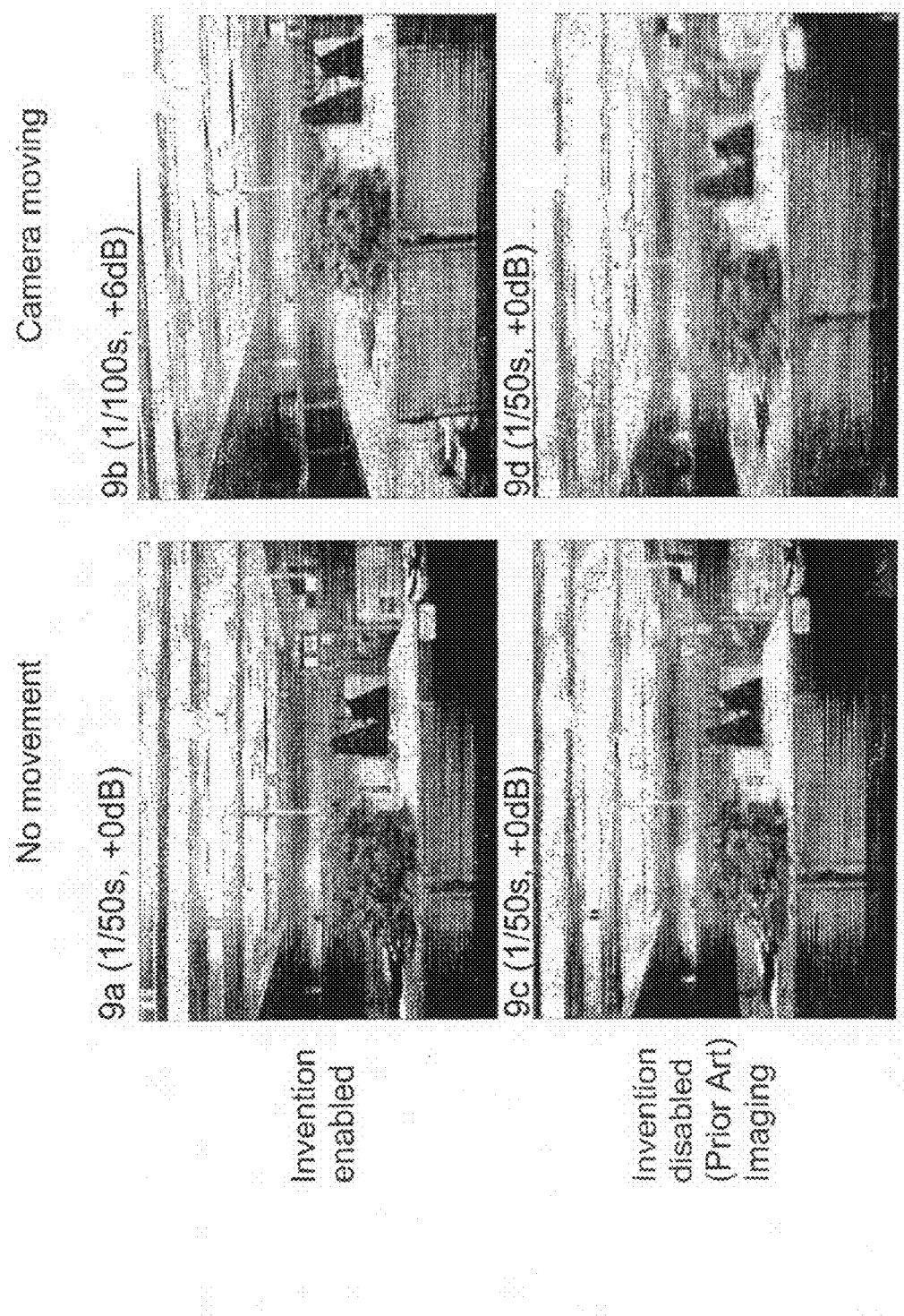
FIGS. 9a-9d show image collages in bright-light imaging situation, in which image shots produced according to the method of the invention are compared with image shots according to the prior art.

In FIGS. 8a-8d, the operation of the invention is illustrated in poor lighting conditions, when imaging the same image subject. In FIGS. 8a and 8c, the camera was held firmly in place, while in FIGS. 8b and 8d the camera was moved upwards evenly and at more or less the same speed. In FIGS. 8a and 8b, the system according to the invention was used, while in FIGS. 8c and 8d it was not in use. Even though the images are black and white, they show excellently the performance of the invention in practice.

As can be very pictorially observed from the images, the invention limits the exposure time only when there is movement in the image. From the images, it can also be seen that motion blurring destroys all details in the images, in which the solution according to the invention was not used. Finally, it can be seen from the images that the noise level increases in FIG. 8b, due to the greater analog gain. Despite this, most of those performing the imaging felt that FIG. 8b was nevertheless better than FIG. 8d.

A corresponding image collage example is shown in FIGS. 9a-9d. In it, there is a situation, in which imaging was performed in bright indoor lighting and the camera was moved horizontally, instead of vertically. Otherwise, the order/observation significance of the images corresponds to the previous example. As can be seen from these examples too, the invention clearly reduces motion blurring, while nevertheless keeping the noise level low.

FIG. 2 shows as a rough schematic diagram an application example of the program product 30 according to the invention. The program product 30 can consist of the storage medium MEM and program code 31 that is executed using the processor means CPU of the equipment 10, written on the storage medium MEM, in order to implement AEC according to the invention, at least partly on a program level. The storage medium MEM of the program code 31 can be, for example, a static or dynamic application memory of the equipment 10, or an AEC circuit-module totality in the imaging chain IC, in which it can be directly integrated.

The program code 31 can include several code means 31.1-31.9 to be performed by the processor means CPU, 11-13, the operation of which can adapted precisely to the method descriptions described above. The code means 31.1-31.9 can form a group of processor commands to be performed sequentially, by means of which the functionalities desired in terms of the invention can be achieved in the equipment 10 according to the invention.

Even though an aperture-adjustment possibility is not depicted in the embodiments described above, the invention can, however, also be applied in pieces of equipment, in which it is possible to adjust the aperture. Thus, for example, in low-light conditions, the aperture can be generally adjusted to be as large as possible, so that as much light as possible will reach the sensor CAM.

The effect of adjusting the aperture is taken into account when calculating the total level of the exposure, i.e. EV-value, if the aperture can be adjusted and it changes. In addition, if equipment with zoom optics is being used, the exposure power will also diminish as the focal length increases.

The change caused by this can also be predicted in the adjustment of the exposure (EV-value calculation). The change in the focal length cannot, however, be used as such for adjusting the exposure, as it would also affect to the cropping of the visible image.

In cameras, the invention permits a sharp image to be taken of moving objects, or the elimination of camera movement (for example, shake) in various lighting conditions, by adjusting the exposure time ET and the analog gain AG, even fully automatically. Shake appears particularly when performing imaging with mobile stations, in which the camera is generally held in only one hand, which is the same hand that pressure the trigger button. Through the invention, motion blurring is avoided, without, however, increasing the noise level to a level that is too disturbing. Finally it should also be stated that bright exposure conditions are not a problem in terms of motion blurring, even for traditional AEC systems.

The invention can also be easily tuned for the requirements of various user-friendly program-products. Examples of these a reference is made to clear-language selection situations, achieved in the imaging program, owing to the invention, for the end-user without any special exposure expertise, such as, for example, 'do not use analog gain that will cause noise, even if not using it will cause motion blurring', as against, 'permit a small amount of noise, if it prevents/reduces motion blurring'. In order to implement such selections, there is a sub-module 31.9 in the code 31 of the program product 30, which offers for the photographer the possibilities for the clear-language selections.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. An apparatus comprising:
   a camera configured to capture a first image frame and a second image frame,
   a determiner configured to determine a required total exposure level from a captured image frame,
   a motion detector configured to detect movement from said first image frame and said second image frame, and
   an adjustor configured to adjust exposure time of said camera for a third image frame, wherein said apparatus is configured to:
   determine a first statistical number of a block of said first image frame,
   determine a second statistical number of a corresponding block of said second image frame,
   detect movement by comparing said first statistical number with said second statistical number
   define specific criterion values for exposure time and an analog gain, wherein at least part of the criterion values of at least the exposure time depends on the detected amount of the movement,
   define a first value range of the total exposure level and a second value range of the total exposure level based on the specific criterion values for the exposure time and the analog gain, and
   adjust the exposure time of the camera, at a value corresponding to the required total exposure level when the required total exposure level is in the first value range of the total exposure level, for capturing the third image frame.

2. The apparatus according to claim 1, wherein said motion detector is configured to compare the variance of a block of said first image frame with the variance of a corresponding block of said second image frame.

3. The apparatus according to claim 2, wherein said image frames are configured to be divided into several blocks, and said motion detector is configured to count the number of those blocks where the absolute value of the difference between the variance of a block of said first image frame and the variance of a corresponding block of said second image frame is greater than or equal to a predetermined threshold value, said exposure time being configured to be adjusted based on said counted number.

4. A method comprising,
   capturing a first image frame and a second image frame using a camera used for digital imaging,
   determining a required total exposure level from a captured image frame,
   detecting movement by determining a first statistical number of a block of said first image frame, by determining a second statistical number of a corresponding block of said second image frame, and by comparing said first statistical number with said second statistical number,
   defining specific criterion values for exposure time and an analog gain, wherein at least part of the criterion values of at least the exposure time depends on the detected amount of the movement,
   defining a first value range of the total exposure level and a second value range of the total exposure level based on the specific criterion values for the exposure time and the analog gain, and
   adjusting the exposure time of a camera, at a value corresponding to the required total exposure level when the required total exposure level is in the first value range of the total exposure level, for capturing a third image frame.

5. The method according to claim 4 comprising comparing the variance of a block of said first image frame with the variance of a corresponding block of said second image frame.

6. The method according to claim 5 further comprising
   dividing said image frames into several blocks,
   counting the number of those blocks where the absolute value of the difference between the variance of a block of said first image frame and the variance of a corresponding block of said second image frame is greater than or equal to a predetermined threshold value, and
   adjusting said exposure time based on said counted number.

7. The method according to claim 4 wherein movement detection is performed independently of determining the required total exposure level.

8. The method according to claim 7, further comprising detecting the movement from different image frames than then determining the required total exposure level.

9. The method according to claim 4, further comprising determining the required total exposure level using an automatic exposure control algorithm.

10. The method according to claim 4, further comprising setting the analog gain corresponding to the required total exposure level when the required total exposure level is in the second value range of the total exposure level.

11. The method according to claim 10, further comprising setting the exposure time at a fixed value.

12. The method according to claim 4, further comprising setting the analog gain at a fixed value.

13. The method according to claim 4, further comprising setting the analog gain to be 1.

14. A program storage medium comprising a storage and a program code written on said storage, said program code when executed by processor being configured to:
   capture a first image frame and a second image frame,
   determine a required total exposure level from a captured image frame,
   detect movement by determining a first statistical number of a block of said first image frame, by determining a second statistical number of a corresponding block of said second image frame, and by comparing said first statistical number with said second statistical number,
   define specific criterion values for exposure time and an analog pain, wherein at least part of the criterion values of at least the exposure time depends on the detected amount of the movement,
   define a first value range of the total exposure level and a second value range of the total exposure level based on the specific criterion values for the exposure time and the analog gain, and adjust the exposure time of a camera, at a value corresponding to the required total exposure level when the required total exposure level is in the first value range of the total exposure level, for capturing a third image frame.

15. The program storage medium according to claim 14, wherein said program code further comprises code configured to compare the variance of a block of said first image frame with the variance of a corresponding block of said second image frame.

16. The program storage medium according to claim 15, wherein said program code further comprises code configured to:

divide said image frames into several blocks, count the number of those blocks where the absolute value of the difference between the variance of a block of said first image frame and the variance of a corresponding block of said second image frame is greater than or equal to a predetermined threshold value, and adjust said exposure time based on said counted number.

17. The program storage medium according to claim 14, wherein said program code further comprises code configured to allow a user to select between a first option which can lead to motion blurring and a second option which reduces or prevents motion blurring.

* * * * *

UNITED STATES PATENT AND TRADEMARK OFFICE
CERTIFICATE OF CORRECTION

PATENT NO. : 8,013,909 B2  
APPLICATION NO. : 11/667140  
DATED : September 6, 2011  
INVENTOR(S) : Nikkanen et al.

Page 1 of 1

It is certified that error appears in the above-identified patent and that said Letters Patent is hereby corrected as shown below:

Claim 8, col. 18, line 33 delete "than".

Signed and Sealed this  
Twenty-second Day of November, 2011

David J. Kappos  
*Director of the United States Patent and Trademark Office*